US012632333B2

(12) United States Patent
Gonzales et al.

(10) Patent No.: US 12,632,333 B2
(45) Date of Patent: May 19, 2026

(54) CORRECTING LATCH UPSET EVENTS IN A TRIM REGISTER

(71) Applicant: Micron Technology, Inc., Boise, ID (US)

(72) Inventors: John M. Gonzales, Boise, ID (US); Christopher G. Wieduwilt, Boise, ID (US); Seth A. Eichmeyer, Boise, ID (US); Matthew D. Jenkinson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 43 days.

(21) Appl. No.: 18/781,064

(22) Filed: Jul. 23, 2024

(65) Prior Publication Data

US 2025/0061017 A1 Feb. 20, 2025

Related U.S. Application Data

(60) Provisional application No. 63/519,584, filed on Aug. 15, 2023.

(51) Int. Cl.
*G06F 11/10* (2006.01)
*G06F 11/07* (2006.01)

(52) U.S. Cl.
CPC ...... *G06F 11/1016* (2013.01); *G06F 11/0772* (2013.01)

(58) Field of Classification Search
CPC ... G06F 11/1016; G06F 11/0772; G11C 29/56
See application file for complete search history.

(56) References Cited

U.S. PATENT DOCUMENTS

| | | | |
|---|---|---|---|
| 11,948,655 B2 | 4/2024 | Eichmeyer et al. | |
| 2015/0279473 A1* | 10/2015 | Yoo | G11C 16/28 |
| | | | 365/185.18 |
| 2016/0064096 A1* | 3/2016 | Micheloni | G11C 16/349 |
| | | | 365/185.11 |
| 2019/0324850 A1* | 10/2019 | Suh | G06F 3/0659 |
| 2020/0104201 A1* | 4/2020 | Kang | G06F 11/3034 |
| 2023/0315918 A1 | 10/2023 | Eichmeyer et al. | |
| 2024/0013846 A1* | 1/2024 | Yun | G11C 29/12005 |

* cited by examiner

*Primary Examiner* — Thien Nguyen
(74) *Attorney, Agent, or Firm* — Brooks, Cameron & Huebsch, PLLC

(57) ABSTRACT

Apparatuses, systems, and methods for correcting latch upset events in a trim register are described. An example method includes sending a command, from a controller, to access at least one block of a plurality of blocks of a non-volatile memory. The method can further include receiving a failure message associated with reading the at least one block. The method can further include, in response to receiving the failure message, resetting trim data associated with the plurality of blocks.

19 Claims, 5 Drawing Sheets

341

SENDING A COMMAND, FROM A CONTROLLER, TO ACCESS AT LEAST ONE BLOCK OF A PLURALITY OF BLOCKS OF A NON-VOLATILE MEMORY — 342

RECEIVING A FAILURE MESSAGE ASSOCIATED WITH READING THE AT LEAST ONE BLOCK FROM THE NON-VOLATILE MEMORY — 343

IN RESPONSE TO RECEIVING THE FAILURE MESSAGE, RESETTING TRIM DATA ASSOCIATED WITH THE PLURALITY OF BLOCKS — 344

450

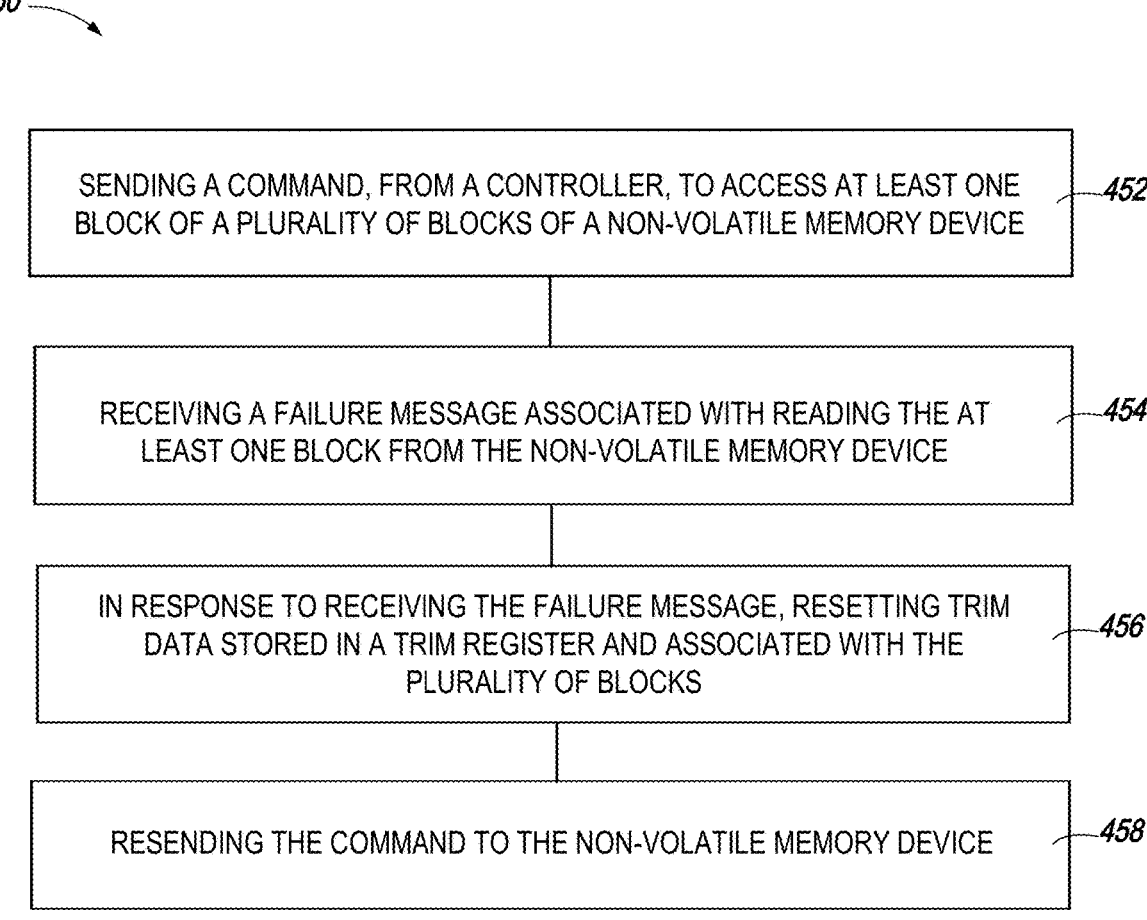

SENDING A COMMAND, FROM A CONTROLLER, TO ACCESS AT LEAST ONE
BLOCK OF A PLURALITY OF BLOCKS OF A NON-VOLATILE MEMORY DEVICE          452

RECEIVING A FAILURE MESSAGE ASSOCIATED WITH READING THE AT
LEAST ONE BLOCK FROM THE NON-VOLATILE MEMORY DEVICE          454

IN RESPONSE TO RECEIVING THE FAILURE MESSAGE, RESETTING TRIM
DATA STORED IN A TRIM REGISTER AND ASSOCIATED WITH THE
PLURALITY OF BLOCKS          456

RESENDING THE COMMAND TO THE NON-VOLATILE MEMORY DEVICE          458

FIG. 4

CORRECTING LATCH UPSET EVENTS IN A TRIM REGISTER

PRIORITY INFORMATION

This application claims the benefit of U.S. Provisional Application No. 63/519,584, filed on Aug. 15, 2023, the contents of which are incorporated herein by reference.

TECHNICAL FIELD

Embodiments of the disclosure relate generally to semiconductor memory apparatuses, systems, and methods, and, more particularly, to apparatuses, systems, and methods related to correcting latch upset events in a trim register.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), and synchronous dynamic random access memory (SDRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

BRIEF DESCRIPTION OF THE DRAWINGS

FIG. 4 is a flow diagram of an example method for correcting latch upset events in a trim register in accordance with some embodiments of the present disclosure.

DETAILED DESCRIPTION

Figure 1:
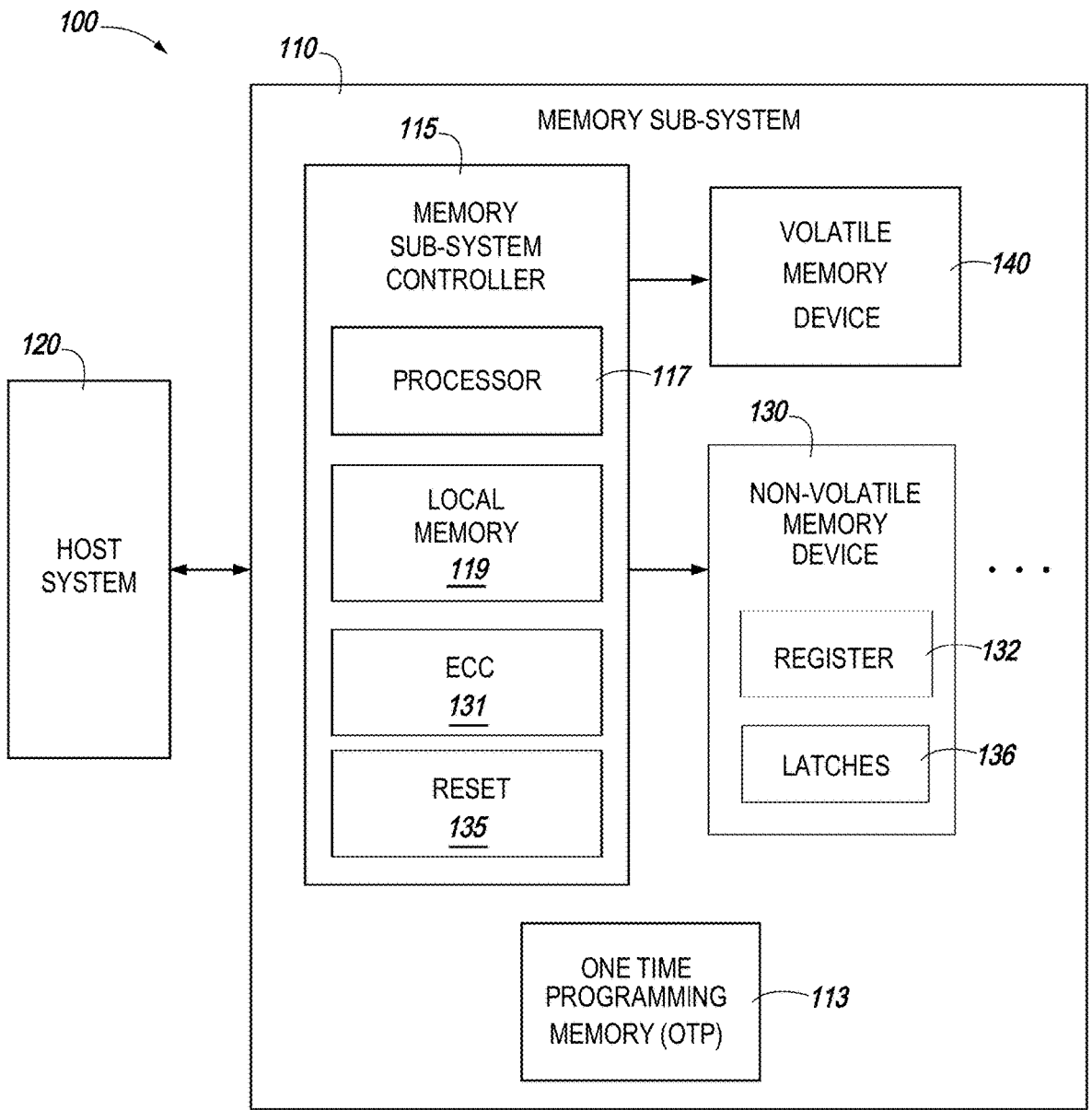
FIG. 1 illustrates an example computing environment that includes a memory sub-system in accordance with some embodiments of the present disclosure.

Apparatuses, systems, and methods for correcting latch upset events in a trim register are described. A memory device can be a non-volatile memory device. One example of a non-volatile memory device is a flash memory system.

Other examples of non-volatile memory devices are described below in conjunction with FIG. 1. A memory device can include a physical block of memory cells (e.g., a collection of data). The memory device can be coupled to a controller within a memory sub-system.

A memory sub-system can be a storage system, storage device, a memory module, or a combination of such. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory operation (e.g., a read, write, or other memory operation) can be initiated to read data from and/or write data to store data in a memory device of the memory sub-system. A controller of the memory sub-system can send a command to read data in a block of memory of a non-volatile memory device. In response to a failure of error correction on the requested data, an error recovery operation can be triggered. However, the failure of error correction may be caused by an error in trim data. For example, trim data can be used to determine whether a block is in use or not in use in order to determine which blocks of memory to erase and/or to allow access to. In the event that the trim data gets corrupted, the trim data may prevent accurate access to blocks of memory and thereby trigger the error recovery operation even though error correction will not solve the problem.

Trim data refers to data stored in a trim register while trim registers are registers in the memory device that store factory settings that govern the operation of the device. A portion of trim data can be used to indicate which blocks of data in the memory device are no longer considered to be "in use" and therefore can be erased internally. Trim data can enable the memory device to handle garbage collection, voltage level settings, timing settings, feature enable settings, redundancy settings, and address mapping, and other such operations, which may otherwise slow down subsequent write operations to the associated blocks more efficiently. In some instances, a latch upset event can introduce errors into the trim data in the trim register(s) in the memory device (e.g., the latch upset event can cause a bit of the trim data to flip or be changed and therefore become inaccurate). As an example, trim data used to indicate which blocks are no longer in use (or, in the alternative, which blocks are in use and should not be erased) can be incorrectly flipped by the latch upset event, causing a block that may still be in use to be indicated as not in use or, vice versa, cause a block that may no longer be in use to be indicated as in use. Such mislabeling can incorrectly allow erasing of a block that should be prevented from being erased or incorrectly prevent a block from being erased that should be erased, thereby reducing the efficient use of the memory blocks and decreasing performance of the memory device. Further, such mislabeling can allow and/or prevent access to blocks in the memory device that should or should not be otherwise allowed or prevented and expend additional memory resources to correct the errors or use the blocks in such a way that should not occur. Therefore, a cycle of error correction and failure may ensue unless the problem is addressed.

Aspects of the present disclosure address the above deficiencies by correcting or resetting the trim data in response to an error correction operation being triggered in order to ensure that the trim data is accurate. In response to the error correction operation being initiated and/or failing, the trim data can be reset. In response to the trim data being reset, a command, such as a read command, can be resent to determine whether the error correction process runs properly after the reset.

In some examples, a command, such as an erase command or a program command, can fail when attempting to erase and/or program a block of memory even though the block of memory is a good block. Before labeling the good block as a bad block due to the failed attempt, trim data can be reset in order to ensure the trim data is accurate. In this way, the trim data can be eliminated as a cause of the failed attempt before determining that the good block is actually a bad block. The controller and/or the memory device can label the memory block as a bad block (e.g., the block is invalid, unable to properly store data, stores invalid data, etc.) or a good block (e.g., the block is valid, stores correct data, is still functioning properly, etc.) within block status data. The block status data can be stored in the controller and/or the memory device based on an indication from the memory device and/or a determination that the memory block is able to store correct data (e.g., labeled a good block) or not able to store correct data (e.g., labeled a bad block). For example, the block status data can indicate whether data within at least one memory block is valid or invalid. For instance, a block that is capable of holding data without introducing errors and/or an uncorrectable amount of errors can be designated as a good block, whereas a block that is prone to errors can be designated as a "bad" block.

In some examples, the memory block can be labeled as a good block or a bad block within latches (e.g., CMOS latches) of the memory device. The memory device can store the block status data that indicates whether each block of a plurality of blocks is a good block or a bad block in an additional memory device (e.g., a one time programming (OTP) memory). The controller can store block status data in a register of the controller and/or, in some examples, in other locations within the memory and/or controller (e.g., such as within a lookup table (LUT)). In the event the trim data reset does not correct the failure, the controller can reset the block status data associated with the blocks within the latches of the memory device by using the block status data stored in the additional memory (e.g., the OTP memory). The controller can then store the updated block status data which indicates whether one of the plurality of blocks is bad (e.g., the block status data) in the latches of the memory device.

In some instances, a latch upset event can cause one of the latches in the memory device and/or latches associated with the trim data to flip (e.g., store incorrect trim data or data about the status of a block of memory). As an example, a good block in the memory can be indicated as good in the block status data of the latches and a latch associated with the good block can be incorrectly flipped by the latch upset event, causing the good block to operate incorrectly and be indicated as a bad block in the latches. Such mislabeling can reduce a quantity of addressable blocks and therefore shorten an operational lifetime of a memory sub-system. Further, such mislabeling can prevent the memory device and/or controller from accessing data within the memory device and expend additional memory resources to either locate the data or retrieve the data from an additional location.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130). In other embodiments, the memory sub-system 110 can include volatile memory devices (e.g., memory device 140) and/or a combination of volatile memory devices and non-volatile memory devices.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130, 140) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM). Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

The memory device 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory device 130 can be grouped as pages that can refer to a logical unit of the memory device used to store data. With some types of memory (e.g., NAND), pages can be grouped to form blocks.

The memory device 130 can include a trim register ("REGISTER") 132. The trim register 132 can store factory settings that govern the operation of the device. Data stored within the trim register can be referred to as trim data. Examples include but are not limited to voltage level settings, timing settings, feature enable settings, redundancy settings, and address mapping. A portion of the trim data stored in the trim register 132 can indicate whether a block in the memory device, 130, 140 is in use and therefore whether to allow the block to be erased. The trim register 132 can store trim data that was transferred or written from a block in the memory device 130 and/or stored in the trim register 132 by the sub-system controller 115. In some examples, the trim data stored in the trim register 132 is the same as the trim data stored in the OTP memory 113. In some examples, the trim data stored in the trim register 132 has been corrupted or has experienced a latch upset event, as described herein. The latch upset event can cause the trim data stored in the trim register 132 to be corrupted or to flip a bit of the trim data or store data different than the trim data stored in the OTP memory 113. The OTP memory 113 can store trim data that does not change and/or that is not corruptible. In response to the trim data in the trim register 132 being different than the trim data in the OTP memory 113, trim data stored in the OTP memory 113 can be loaded into the trim register 132 to remedy the error that was introduced by the latch upset event.

The memory device 130 can include latches 136 used to store block status data in the memory device 130 (e.g., such as CMOS latches). In some examples, the block status data stored in the latches 136 can be corrupted or can experience a latch upset event, as described herein. The latch upset event can cause the block status data stored in the latches 136 to be corrupted or to have a latch flip or store data different than the block status data stored in the trim register 132. The OTP memory 113 can store block status data that does not change and/or that is not corruptible. In response to the block status data in the latches 136 being different than the block status data in the OTP memory 113, block status data stored in the OTP memory 113 can be loaded into the latches 136 to remedy the error that was introduced by the latch upset event.

Although non-volatile memory components such as NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

In some embodiments, the memory sub-system 110 includes at least a portion of the OTP memory 113. For example, the memory sub-system controller 115 can communicate with the OTP memory 113 portion within the memory sub-system 110 to perform the operations described herein. Trim data can be stored in the OTP memory 113. A portion of trim data can be used to indicate whether a particular block of memory in the memory device 130, 140 is in use and therefore should be prevented from being erased or is not in use and therefore can be erased without causing problems with the memory operation of the memory device 130, 140.

The memory sub-system controller 115 (or controller 115 for simplicity) can communicate with the memory devices 130, 140 to perform operations such as reading data, writing (e.g., program) data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. For example, the processor 117 (e.g., processing device) can be configured to execute instructions stored in local memory 119 for performing the operations described herein to read and/or write to the blocks of memory within the memory device 130 and/or read from the OTP memory 113.

The memory sub-system controller 115 can include error correction code (ECC) capability which is performed by an ECC component 131 of the memory sub-system controller 115. The ECC component 131 can include error correction circuitry and/or components to perform a number of error corrections. The ECC component 131 can be coupled to the memory device 130 and correct errors as the data is read out from the memory device 130 through output buffers. In some embodiments, circuitry of the ECC component 131 and/or instructions provided to the memory sub-system controller 115 can control performing a repair operation on the rows of memory cells that have a particular quantity of errors.

The memory sub-system controller 115 can include a reset component 135. The reset component 135 can include hardware, firmware, and/or circuitry used to reset the trim data within the trim register 132. The reset component 135 can reset the trim data in response to a failed error correction operation, a failed erase operation or failed program operation, etc. Rather than initially indicating a block is a bad block in response to these failures, the trim data can be reset in order to correct any errors in the trim data that may be preventing access to the blocks.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130, 140. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller for media management within the same memory device package. An example of a managed memory device is a managed NAND (MNAND) device.

The non-volatile memory device 130 can store a plurality of physical blocks of memory cells (e.g., a collection of data). The plurality of physical blocks can be indicated as in use or not in use within trim data in order to track which blocks of the plurality of physical blocks can be erased or which should be prevented from being erased. The trim data can be stored within the OTP memory device 113 within the non-volatile memory device 130 using latches. For example, the OTP memory device 113 can include one or more latches that are configured to store the trim data. Although not shown in FIG. 1 so as to not obfuscate the drawings, the OTP memory device 113 can include various circuitry to facilitate data storage. For example, the OTP memory device 113 can include special purpose circuitry in the form of an ASIC, FPGA, state machine, and/or other logic circuitry that can allow the OTP memory device 113 to store the trim data.

The stored trim data within the OTP memory device 113 can be compared to the trim data stored in the trim register 132 of the memory device 130. In some examples, the comparison of trim data in the trim register 132 to trim data in the OTP memory 113 can occur at particular time intervals or time periods and/or can be coordinated or tied to particular memory operations or cyclical operations associated with erasing blocks of memory or garbage collection operations. Further, the comparison can occur at particular time intervals or time periods thereby tracking the occurrence of latch upset events in a repeating pattern. In the event that the comparison of trim data in the OTP memory 113 with trim data in the trim register 132 in the memory device 130 determines a match, the trim data in the memory device 130 can be considered valid (and thereby not need to be loaded or written over by the trim data in the OTP memory 113). Likewise, in the event that the comparison does not determine a match, the trim data can be considered invalid and the trim data stored in the memory device can be written over by the trim data in the OTP memory 113.

Figure 2:
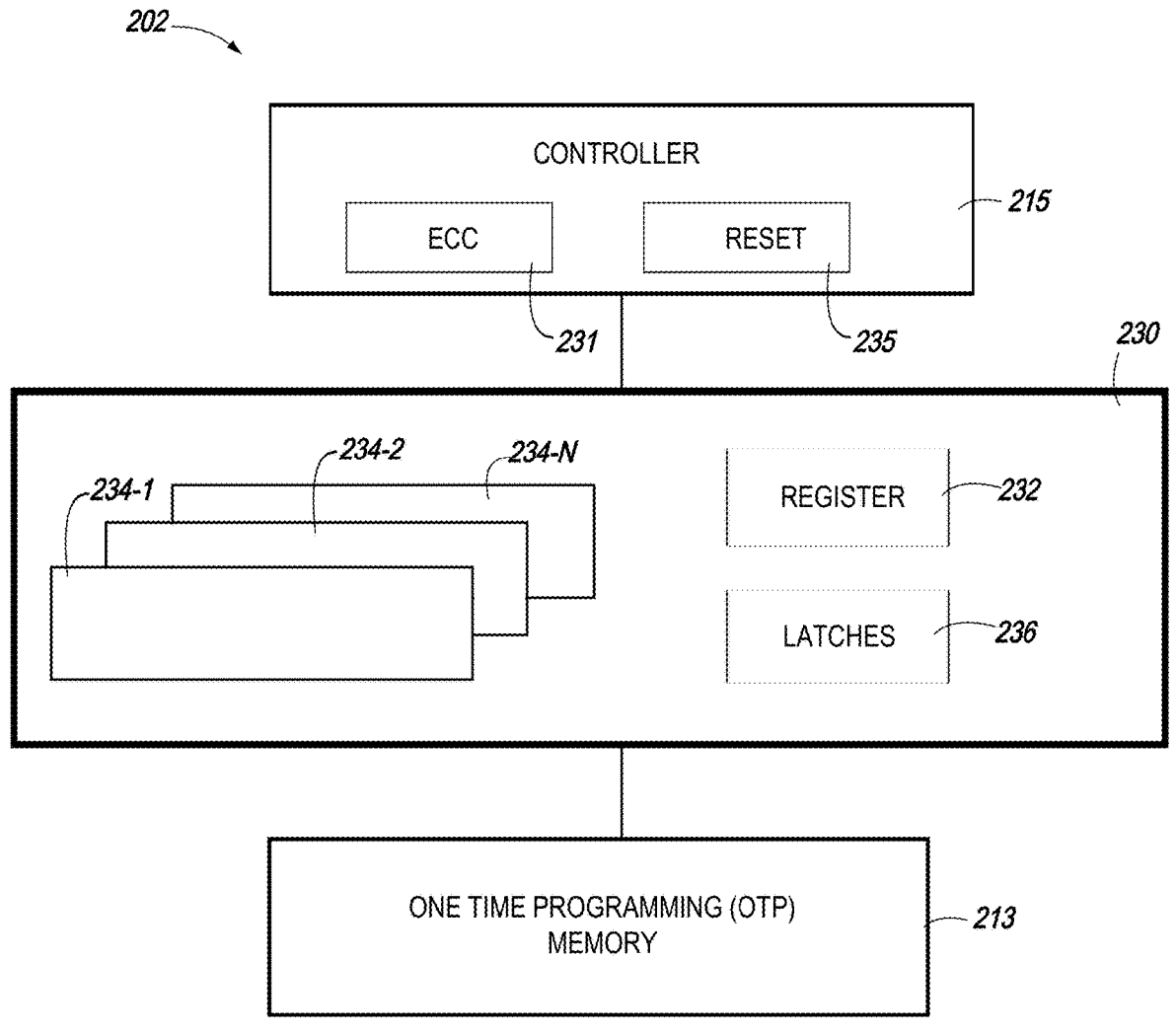
FIG. 2 is an example memory system for correcting latch upset events in a trim register in accordance with some embodiments of the present disclosure.

FIG. 2 is an example memory system 202 for correcting latch upset events in a trim register in accordance with some embodiments of the present disclosure. The example memory system 202 can include a memory sub-system controller 215. The memory sub-system controller 215 can monitor memory blocks 234-1, 234-2, . . . , 234-N (hereinafter referred to collectively as memory blocks 234) within the non-volatile memory device 230 and provide input for the bad block list, indicating which of the memory blocks 234 are in use (e.g., good blocks) or not (e.g., bad blocks). The bad block list can be stored within an OTP memory 213 (e.g., analogous to the OTP memory 113 illustrated in FIG. 1) and/or within a trim register 232 of the memory device 230. Although only one portion of blocks of memory cells is illustrated, embodiments are not so limited and an unlimited amount of portions of blocks of memory may be within the non-volatile memory device, whose associated data can be stored partially or entirely within the OTP memory 213. The data can indicate whether a particular memory block is in use for purposes of erasure and/or garbage collection. For example, the data can indicate whether a block can be read, erased, programmed or written to without generating or inserting errors (e.g., without incurring an amount of errors that exceeds an error correction capability associated with the memory device 213).

A latch upset event can be defined as an occurrence that causes a latch to become inadvertently enabled. A latch upset event can be caused by a disruption from a particle and/or any unpredictable electrical event that results in a latch changing state. The disruption can be a radiation event. One such occurrence of a radiation event can be the interaction between one or more neutrons and a component of the memory device. In one example, a latch upset event can be caused by silicon particles colliding with neutrons (e.g., referred to as a neutron strike) of a latch within the memory device. The silicon particle can attract a charge and change the data within the latch. In another example, a latch upset event can be caused by alpha particles colliding with particles of the latch. But embodiments are not so limited, any occurrence that causes a collision with particles of the latch can cause a latch upset event. For example, the latch upset event can flip a latch of the trim data within the memory device 230. A latch upset event can prevent the controller 215 from accessing data within the particular block due to the trim data being inaccurate or no longer valid. For example, a block that is in use and should not be erased could be erased if the trim data associated with the block is invalid and incorrectly indicates the block is not in use, and vice versa.

The controller 215 can include an error correction code (ECC) component 231 (e.g., analogous to ECC component 131 in FIG. 1). The ECC component 231 can include error correction circuitry and/or components to perform a number of error corrections. The ECC component 231 can be coupled to the memory device 130 and correct errors as the data is read out from the memory device 230 through output buffers. In some embodiments, circuitry of the ECC component 231 and/or instructions provided to the memory sub-system controller 215 can control performing a repair operation on the rows of memory cells that have a particular quantity of errors.

The controller can include a reset component 235 (e.g., analogous to reset component 135 in FIG. 1). The reset component 135 can include hardware, firmware, and/or circuitry used to reset the trim data within the trim register 132. The reset component 135 can reset the trim data in response to a failed error correction operation, a failed erase operation or failed program operation, etc. Rather than initially indicating a block is a bad block in response to these failures, the trim data can be reset in order to correct any errors in the trim data that may be preventing access to the blocks.

The memory device 230 can include a trim register ("REGISTER") 232. The trim register 232 can store trim data. In some examples, the controller 215 can be used to compare trim data stored in the trim register 232 of the memory device 230 to trim data stored in the OTP memory 213. In this way, whether the trim data has changed from the first time point to the second time point can be determined. In this way, the trim data in the trim register 232 can be verified to be correct or incorrect and/or the occurrence of a latch upset event can be determined.

In response to the ECC component 231 failing to perform an error correction operation in response to receiving a command to read data in at least one block of the plurality of memory blocks 234, the reset component 235 can reset the trim data stored in the trim register 232 before determining that the at least one block is a bad block. In this way, the block status data in the latches 236 can be maintained until the trim data is verified as accurate. If the trim data is accurate and the error correction operation is still failing, the block status data may be the cause. In this instance, once the trim data is reset, and in response to error correction continuing to fail, the block status data can be reloaded from the OTP memory 213 into the trim register 232.

Figure 3:
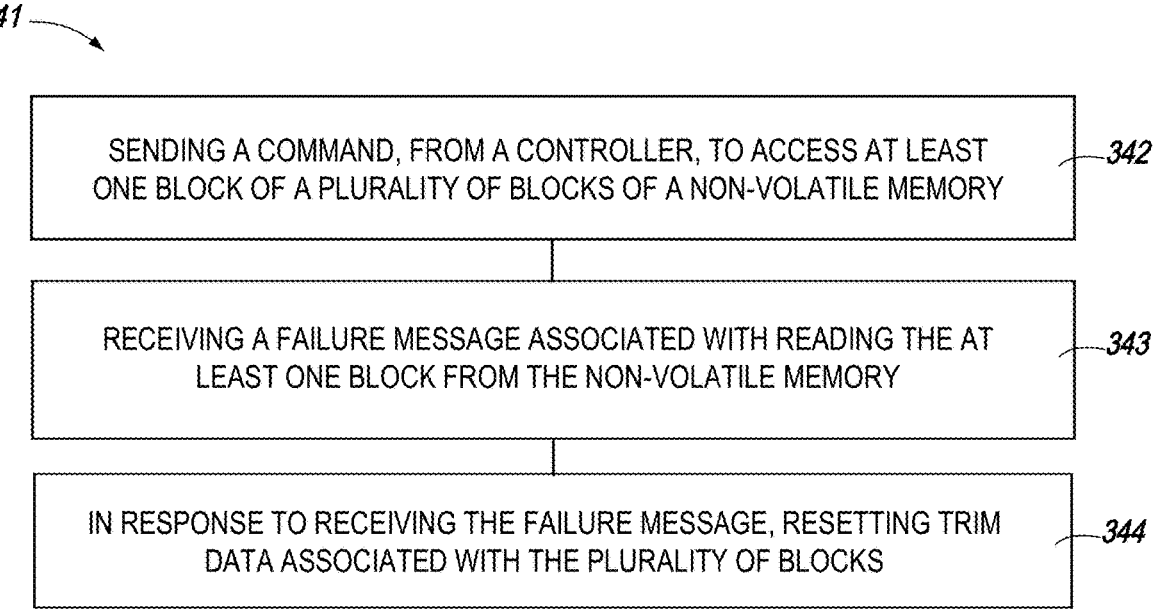
FIG. 3 is a flow diagram of an example method for correcting latch upset events in a trim register in accordance with some embodiments of the present disclosure.

FIG. 3 is a flow diagram of an example method 341 corresponding to correcting latch upset events in a trim register in accordance with some embodiments of the present disclosure. The method 341 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 341 can be performed by the memory sub-system controller 115 and 215 of FIGS. 1-2 respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 342, the method 341 includes sending a command, from a controller, to access at least one block of a plurality of blocks of a non-volatile memory. The plurality of blocks of data can be analogous to the plurality of memory blocks of data 234 in FIG. 2. The non-volatile memory can be analogous to memory device 130 and 230 in FIGS. 1-2.

At operation 343, the method 341 includes receiving a failure message associated with reading the at least one block from the non-volatile memory. As an example, the command can be received and an attempt to read data in the at least one block can be performed and fail. The data may not be able to be read from the at least one block due to trim data associated with the at least one block being inaccurate or corrupted.

At operation 344, the method 341 includes resetting trim data associated with the plurality of blocks in response to receiving the failure message. Trim data refers to data stored in a trim register while trim registers are registers in the memory device that store factory settings that govern the operation of the device. A portion of trim data can be used to indicate which blocks of data in the memory device are no longer considered to be "in use" and therefore can be erased internally. Trim data can enable the memory device to handle garbage collection, voltage level settings, timing settings, feature enable settings, redundancy settings, and address mapping, and other such operations, which may otherwise slow down subsequent write operations to the associated blocks more efficiently. In some instances, a latch upset event can introduce errors into the trim data in the trim register(s) in the memory device (e.g., the latch upset event can cause a bit of the trim data to flip or be changed and therefore become inaccurate). The trim data can be reset by loading or writing data from a one-time programmable memory that stores trim data (and whose trim data does not change).

In some examples, the method 341 can further include resending the command to read data from the at least one block. In some examples, the method 341 can further include receiving data associated with the at least one block from the non-volatile memory device at the controller in response to resending the command. In some examples, the failure message is an error correction code (ECC) failure message. In some examples, the command is a read command requesting to read data from the at least one block. In some examples, resetting the trim data includes writing trim data from a one-time programming memory to a trim register. In some examples, the method includes receiving data associated with the at least one block from the non-volatile memory device at the controller in response to resending the command. In some examples, the method includes performing an error correction operation subsequent to resetting the trim data. In some examples, the command can be resent in response to performing the error correction operation.

FIG. 4 is a flow diagram of an example method 450 corresponding to correcting latch upset events in a trim register in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 can be performed by the memory sub-system controller 115 and 215 of FIGS. 1-2, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 452, the method 450 includes sending a command, from a controller, to access at least one block of a plurality of blocks of a non-volatile memory device. In some examples, the command is one of an erase command or a program command. The non-volatile memory device is analogous to the non-volatile memory (NVM) device 130 and 230 in FIGS. 1-2. The non-volatile memory device can include trim registers configured to store trim data. At operation 454, the method 450 includes receiving a failure message associated with reading the at least one block from the non-volatile memory device. The failure message can indicate that an error correction operation has failed. The failure message can indicate either that the trim data is corrupted or incorrect (since access to the blocks of memory has been compromised) or that the block status data has been corrupted or is inaccurate due to the at least one block being labeled as a bad block (even though the at least one block may be a good block but is mislabeled due to the corruption). The corruption or inaccuracy of the data can be caused by a latch upset event (e.g., a radiation event such as a neutron strike and/or other type of radiation event).

At operation 456, the method 450 includes, in response to receiving the failure message, resetting trim data stored in a trim register and associated with the plurality of blocks. The trim data may be stored in the trim register such as those described herein. The trim data can be reset prior to changing the block status from the good block to a bad block. In this way, the accuracy of the trim data can be verified prior to determining that the block is a bad block (which may be mistaken or inaccurate). In some examples, the trim data can be reset by reloading previously stored trim data from a one-time programmable (OTP) memory to a trim register.

At operation 458, the method 450 includes resending the command to the non-volatile memory device. The command can be resent to determine whether the resetting of the trim data corrected the trim data and thereby permits the data to be accessed or read. If the data in the at least one block is now readable, the trim data may have been the issue and is now corrected. The block status of the at least one block can be maintained as the good block in response to receiving access to the at least one block due to resending the command. In some examples, the block status can be maintained in block status data stored within complementary metal-oxide semiconductor (CMOS) latches of the non-volatile memory. However, in some examples, the block status of the at least one block can be changed from a good block to a bad block in response to an additional failure message being received from the non-volatile memory device subsequent to resending the command. Further, a determination that a latch upset event has occurred can be made responsive to receiving the additional failure message. The latch upset event can refer to an occurrence of a radiation event.

Figure 5:
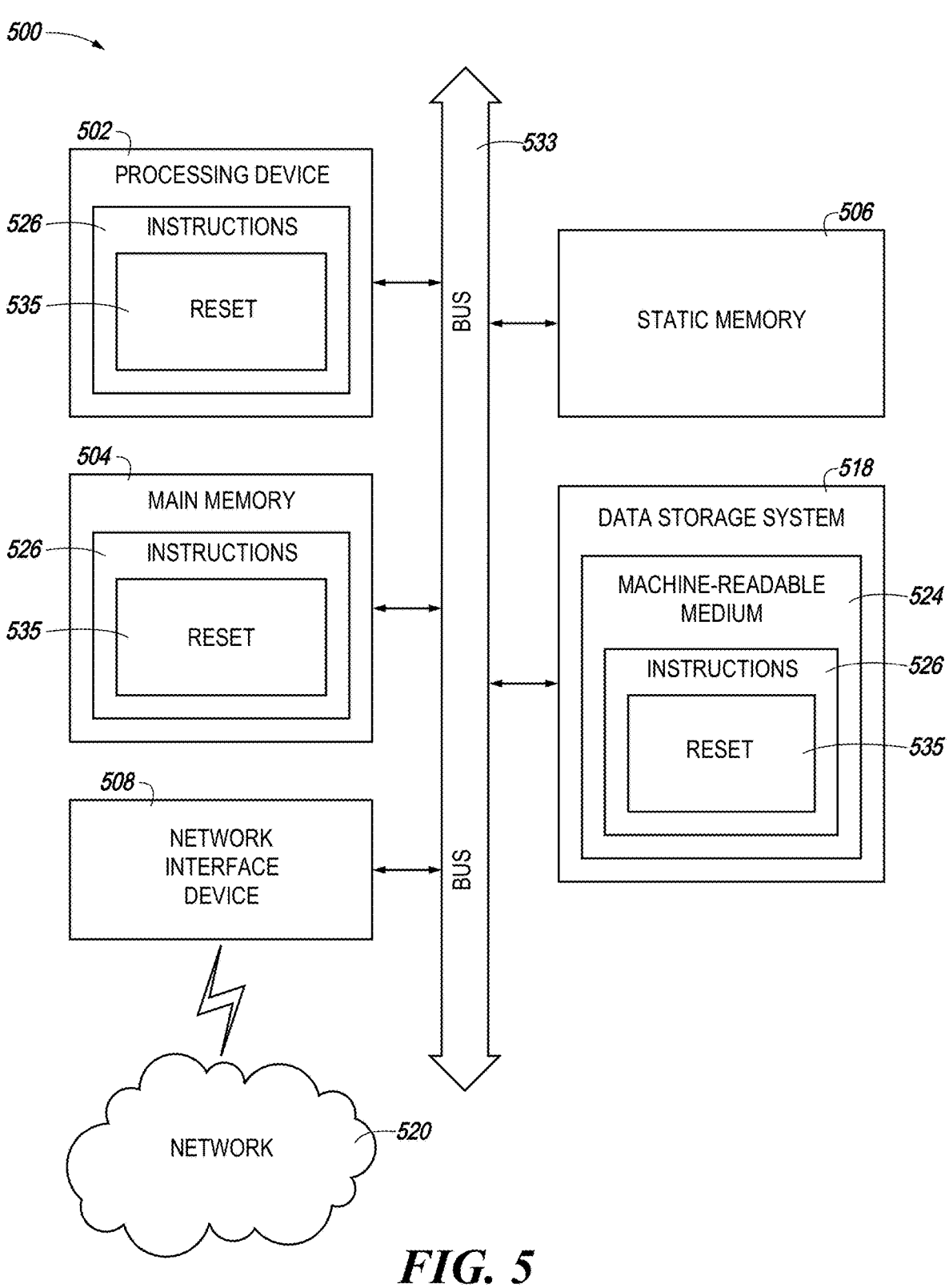
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., monitor or reload block status data) and of the reset component 531 (e.g., to reset trim data). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 533. The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and stages discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality using data stored in an OTP memory and resetting the trim register using a reset component 535, which can be analogous to trim component 135 in FIG. 1. The reset component 535 can include circuitry and/or hardware to perform a reset of trim data in the trim register by writing data from an additional memory device (e.g., an OTP memory) to the trim register. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

storing trim data associated with a plurality of blocks in a memory location external to a non-volatile memory device;

storing the trim data in a trim register located on the non-volatile memory device;

sending a command, from a controller, to access at least one block of the plurality of blocks of the non-volatile memory device;

receiving a failure message associated with accessing the at least one block; and in response to receiving the failure message, resetting the trim data stored in the trim register by loading the trim data from the memory location external to the non-volatile memory device to the trim register.

2. The method of claim 1, further comprising resending a command to read data from the at least one block in response to resetting the trim data.

3. The method of claim 1, further comprising, in response to sending the command, receiving data associated with the at least one block of the non-volatile memory device at the controller.

4. The method of claim 1, wherein;

the method includes performing an error correction code (ECC) operation using ECC circuitry; and wherein the failure message is an (ECC) failure message.

5. The method of claim 1, wherein the command is a read command requesting to read data from the at least one block.

6. An apparatus, comprising:

a non-volatile memory device comprising a plurality of blocks of memory; and a controller coupled to the non-volatile memory device and configured to:

store trim data associated with the plurality of blocks in a memory location external to the non-volatile memory device;

store the trim data in a trim register on the non-volatile memory device;

send a command, from the controller, to access at least one block of the plurality of blocks of the non-volatile memory device;

receive a failure message associated with accessing the at least one block from the non-volatile memory device, wherein a block status of the at least one block indicates the at least one block is a good block;

in response to receiving the failure message, reset the trim data stored in the trim register by loading the trim data from the memory location external to the non-volatile memory device, to the trim register; and resend the command to the non-volatile memory device.

7. The apparatus of claim 6, wherein the command is one of an erase command or a program command.

8. The apparatus of claim 6, wherein the controller is configured to reset the trim data prior to changing the block status from the good block to a bad block.

9. The apparatus of claim 8, wherein the controller is configured to change the block status of the at least one block from the good block to the bad block in response to an additional failure message being received from the non-volatile memory device subsequent to resending the command.

10. The apparatus of claim 9, wherein the controller is configured to determine that a latch upset event has occurred responsive to receiving the additional failure message.

11. The apparatus of claim 10, wherein the latch upset event is an occurrence of a radiation event.

12. The apparatus of claim 8, wherein the controller is configured to maintain the block status of the at least one block as the good block in response to receiving access to the at least one block due to resending the command.

13. The apparatus of claim 7, wherein the memory location external to the non-volatile memory device is a one-time programmable (OTP) memory.

14. The apparatus of claim 6, wherein the controller is configured to maintain the block status in block status data stored within latches of the non-volatile memory device.

15. The apparatus of claim 6, wherein the controller is configured to read data from the at least one block in response to resending the command.

16. An apparatus, comprising:

a non-volatile memory device comprising a plurality of blocks of memory; and a controller coupled to the non-volatile memory device and configured to:

store trim data associated with the plurality of blocks in a memory location external to the non-volatile memory device;

store the trim data in a trim register located on the non-volatile memory device;

send a command to access at least one block of the plurality of blocks of the non-volatile memory device;

receive a failure message associated with accessing the at least one block from the non-volatile memory device;

in response to receiving the failure message, reset the trim data stored in a trim register by loading the trim data from the memory location external to the non-volatile memory device to the trim register; and resend the command to read data from the at least one block.

17. The apparatus of claim 16, wherein the controller is configured to receive data associated with the at least one block from the non-volatile memory device at the controller in response to resending the command.

18. The apparatus of claim 16, wherein the controller is configured to perform an error correction operation subsequent to resetting the trim data.

19. The apparatus of claim 18, wherein the controller is configured to resend the command in response to performing the error correction operation.

* * * * *